United States Patent

[11] 3,548,782

| [72] | Inventors | Dwight H. Bergquist;<br>Franklin E. Cunningham; Charles H. Cook,<br>Springfield, Mo. |
|------|-----------|---|
| [21] | Appl. No. | 687,038 |
| [22] | Filed | Nov. 30, 1967 |
| [45] | Patented | Dec. 22, 1970 |
| [73] | Assignee | Henningsen Foods, Inc.<br>New York, N.Y.<br>a corporation of New York |

[54] MEANS FOR FORMING A CONTINUOUS COATING ON PARTICLES
4 Claims, 3 Drawing Figs.

[52] U.S. Cl. ............................................. 118/20,
99/113, 99/170, 99/210; 117/100; 118/22, 118/24,
118/303; 264/117
[51] Int. Cl. ....................................... B05b 17/00;
A23g 3/20
[50] Field of Search ........................................ 117/100,
66, 165, 119.8; 99/170, 210, 113; 264/117;
118/19, 20, 24, 25, 303, 22

[56] References Cited
UNITED STATES PATENTS

| 2,167,432 | 7/1939 | Cox et al. | 117/100X |
|-----------|--------|------------|----------|
| 2,478,889 | 8/1949 | Harris | 99/210 |
| 2,856,290 | 10/1958 | Peebles | 117/100X |
| 2,871,774 | 2/1959 | Johnson | 117/100X |
| 2,900,256 | 8/1959 | Scott | 99/210X |
| 3,065,076 | 11/1962 | Wenner et al. | 99/210X |
| 3,082,098 | 3/1963 | Bergquist | 99/210 |
| 3,085,492 | 4/1963 | Peebles | 99/210X |
| 3,135,612 | 6/1964 | Hair et al. | 99/210X |
| 3,143,428 | 8/1964 | Reimers et al. | 117/100X |
| 3,263,592 | 8/1966 | Hickey et al. | 118/19 |

Primary Examiner—William D. Martin
Assistant Examiner—Mathew R. P. Perrone
Attorney—Norman N. Holland ABSTRACT: A process and apparatus for forming a continuous coating on particles which is particularly useful in applying a coating to the individual particles of powdered substances such as powdered egg products or powdered milk or other powdered products. In the process, the powdered product is first at least partially covered with a liquid covering of the coating substance which is preferably sprayed onto the powder particles as they are carried in a stream of air or otherwise agitated. The coated particles are then collected and subjected to a mechanical mixing or agitation during which the individual particles are caused to move over one another. A preferred method of mixing moves the liquid coated particles along an inclined path by a worm or screw conveyor. The combined rotational and forward movement of the particles results in the formation of a complete liquid coating over the entire surfaces of all particles. Thereafter, the particles are transferred to pans or to a conveyor where they are subjected to a drying step.

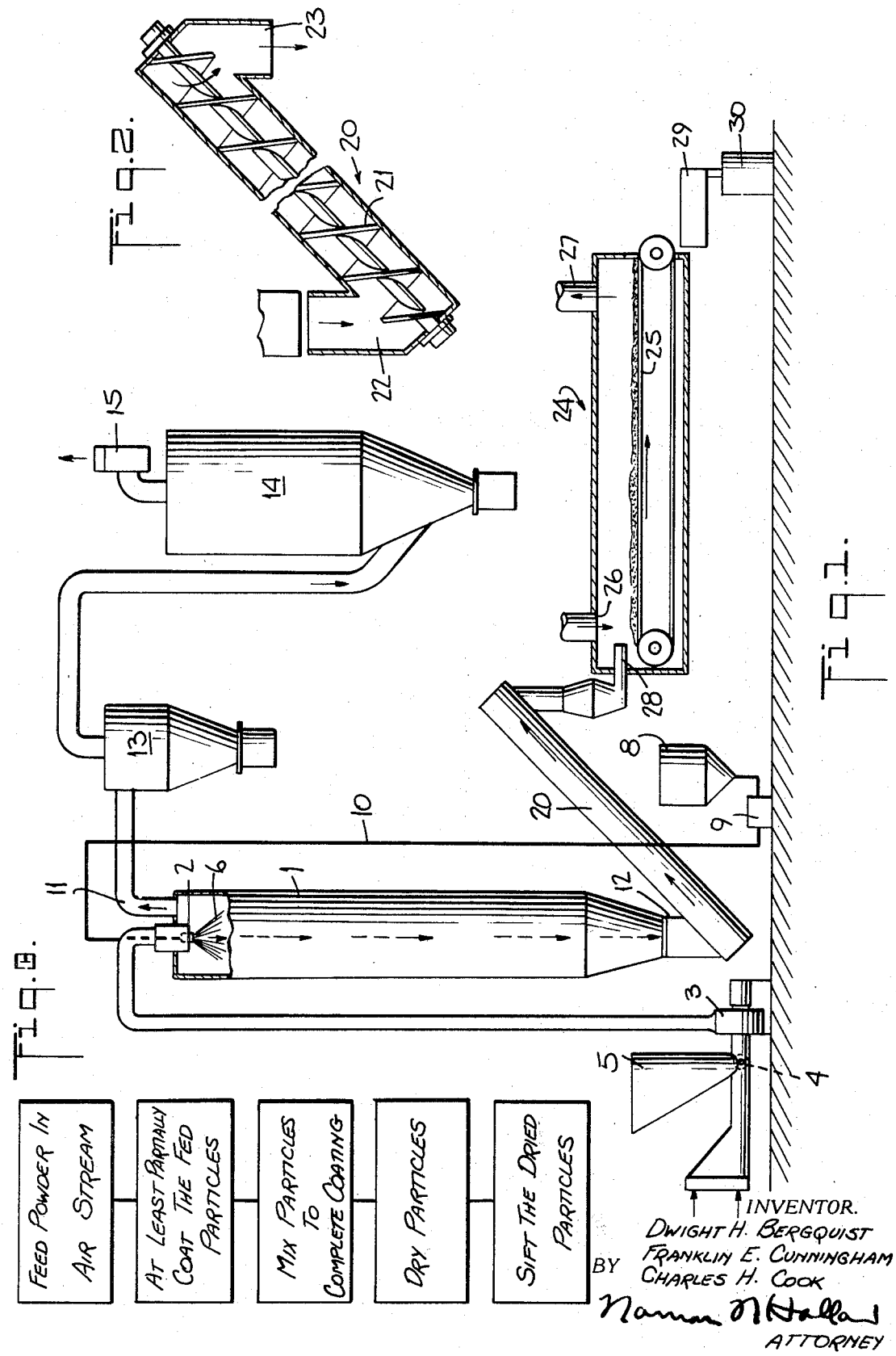

MEANS FOR FORMING A CONTINUOUS COATING ON PARTICLES

The present invention relates to an improved method and apparatus for forming uniform coatings on minute particles, as for example, for forming continuous coatings of a concentrated sugar solution on individual or agglomerated particles of powdered egg white or another powdered product. While useful in a variety of particle coating processes, the new method is particularly useful in forming continuous coatings on powdered products where the coatings are applied to improve the water solubility of powdered products.

An improved powdered egg white is described, for example, in copending patent application Ser. No. 670,405 filed Sept. 25, 1967 and owned by the assignee of the present invention. This prior application describes an improved instant dissolving powdered egg white where the improvements are obtained at least partially through the application of a continuous coating of a concentrated sugar solution onto the individual powdered egg white particles and the best results are obtained with such coatings where a continuous overall coating is obtained on the particles.

The coating of powdered products including food products has been known and used various reasons and prior coatings have normally been applied by exposing the individual powdered particles to a liquid spray either by passing the particles through the spray on belts or in streams of moving air or gas or in some cases by supporting the particles on an upward blast of air while spraying the coating solution through the blast. Such systems have been found satisfactory where the end use of the product does not require a continuous overall coating such as where the coating has been used for flavoring or coloring or other reasons. We have found, however, that significantly improved results are obtained with respect to coatings for improving their water solubility where the coatings are complete and fully surround each individual coated particle or each agglomeration of particles. We have discovered, for example, that t where sugar coatings are applied for improved solubility the slightest break or discontinuity in the coating provides for a significant reduction or loss in the solubility of the powders. Thus, while significant improvements have been made in the coating of particles with the solutions described in the above noted application, even better results are obtained where complete coatings are obtained. It has been found that the present known systems of applying the coatings by spray treatments while apparently giving complete coatings, actually do not provide overall continuous coatings on the particles.

The improved coating process and means of the present invention have been found both by microscopic examination and by actual testing of powdered products to provide complete coatings even where the coatings are of minimum thickness.

Accordingly, an object of the present invention is to provide an improved method and means for coating particles.

Another object of the present invention is to provide continuous and complete coatings on the individual minute particles of a powdered product.

Another object of the present invention is to provide a continuous method and related apparatus for applying a complete coating to the individual particles of a powdered product.

Another object of the present invention is to provide an improved method and means of continuously coating powdered food products.

Another object of the present invention is to provide an improved method and means for manufacturing powdered egg products.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a diagrammatic illustration of a preferred apparatus for performing the method of the invention;

FIG. 2 is an enlarged detailed sectional view of a preferred means for mechanically completing the coating of the particles; and FIG. 3 is a block diagram setting forth the steps of a preferred embodiment of the method.

It will be clear from the following description of the preferred embodiments of the method and apparatus that they are applicable to the coating of a variety of powdered products and particularly food products. The applicants have found that this process is particularly useful in the formation of coatings on powdered products such as powdered egg products including powdered egg white and have used the process to advantage in the formation of a concentrated sugar coating on the individual egg white particles. The preferred embodiment of the process and apparatus will be described below by way of example in the application of a concentrated solution of sugar to powdered egg white but it is clear that the invention is applicable to other particle coating operations.

The first step in the continuous process consists of the application of the liquid coating to the individual particles of the powdered product. Where the coating is a sugar solution, for example, it is sprayed onto the egg white powder as the powder is carried past the nozzles by a stream of air. FIG. 1 illustrates a preferred apparatus for the coating process. The spray coating is first applied in the vertical application chamber 1 into which the powdered particles are fed through the air inlet 2. A stream of air is fed through the inlet 2 from a fan 3 and carries with it the dried egg white powder which is fed into the air stream by a feed screw 4 mounted beneath a feed hopper 5. The rate of feed is adjusted in combination with the velocity of the air as supplied with the fan 3 to form a uniform particle concentration in the moving air.

Typical spray dried egg white in powdered form comprises particles having a mean diameter of about 40 microns. These particles are moved in the air stream past a sugar solution spray nozzle 6 mounted coaxially at the center of the feed inlet 2 so that the powdered particles pass through a conical spray pattern from the nozzle 6.

As the particles pass through the spray, each particle picks up fine droplets of the sugar solution. These particles with their partial coatings have been found to form agglomerates which include particles up to ten times the main diameter of the original particles. Thus, particles which fall to the lower end of the coating application chamber 1 comprise uniform agglomerates which in typical operating conditions have been found to comprise substantially uniform particles of about 400 microns a diameter.

The coating solution is prepared in a supply tank 8 and is then pumped by a pump 9 to the coating nozzle 6 through a feed line 10 connected to the nozzle 6. A concentrated sugar coating solution, for example, may consist of about 60 pounds of sucrose dissolved in about 40 pounds of water. The usual type of spray nozzles may be used including pressure nozzles or two-fluid atomizing nozzles or other nozzles which will form a mist of the solution at the nozzle 6.

An air exit 11 is provided in the application chamber 1 at a position such as the chamber top which is spaced from the powder outlet 12 at the chamber bottom. This exhaust system preferably includes a particle collector 13 such as a cyclone collector and also a bag collector 14 to remove any extraneous particles remaining in the air. The exhaust air which is passed through the collector system is exhausted directly to the atmosphere through a suitable discharge fan 15.

The particles which have been subjected to the spray and which pass out of the chamber 1 outlet 12 in most cases lack the continuous coating which provide the advantages described above. It has been found that a mechanical mixing of these partially coated particles results in the formation of a complete coating. A mechanical mixing in a rotary mixer such as a Hobart mixer of the type having mixing blade rotated at adjustable speeds has been found to provide a substantial improvement in the coverage of the coating. A 1-minute mixing period, for example, in a commercial 60-quart Hobart mixer using a paddle or mechanical mixing blade operated at relatively low speed has been found to improve the coating coverage when used with an aqueous sugar solution consisting of about 60 percent sugar.

Mechanical mixing in this manner, however, is not practical for larger quantities of coated products as it is a batch operation not readily adaptable to a continuous particle coating application. A full coating and complete coverage of the individual particles or the agglomerates has been obtained with the embodiment of the mechanical mixing device 20 as illustrated in detail in FIG. 2. This mixing device comprises means for providing a simultaneous rotational and axial movement for the particles as obtained by a spiral conveyor 21 of the form illustrated where the powder passes from the lower end 22 to the upper end 23 with the spiral conveyor 21 raising the powder against the force of gravity with the aforementioned rotary and axial movement. A typical system, for example, includes a screw conveyor from about 10 to 12 feet long and about 8 inches in diameter which lifts the powder at a 45° angle while revolving at a speed of about 100 r.p.m.

This device provides a mixing action in which the individual particles or agglomerated particles are rolled over one another and whereby the individual particles or the agglomerates achieve a complete overall sugar solution or other coating.

The coated particles passing out of the mixer 21 are given a final drying in a drier 24 to remove the small amount of moisture added by the sugar solution. The powder may be applied to trays or to a conveyor belt 25 as illustrated for convenient exposure to a suitable drying furnace or tunnel dryer in which a stream of heated air is shown passing between inlet 26 and outlet 27. A vibratory feeder 28 is used to assure a uniform spread of the powder on the belt 25. The dried and coated powder is fed through a sifter 29 to suitable package or storage means 30.

It will be seen that the preferred embodiment described above provides a continuous process for all steps which not only simplifies manufacture but which also permits a stabilizing or achieving of uniform properties in the related steps for controlling both the coating thickness and coverage as well as the agglomeration size of the coated particles. It is desirable, for example, to control the run so that the coated product consists of agglomerated particles having some particular size or median number of included particles. In a continuous operation of the type described this may be achieved by adjusting the several conditions of the coating steps such as the rates of air flow for feeding the coating chamber, the spraying pressures for controlling spray droplets size, and other factors such as air temperatures and drying times.

The above description in which the preferred example relates to the formation of instant drying powdered egg products describes one extremely useful application of the new process. Other coatings where egg or other products are coated with protective or flavor coatings including corn syrup, liquid dextrines, starches, or fats are also advantageously applied by this process. In addition to improving the solubility of powdered products, complete coatings are also of extreme value in certain instances where powdered products are to be protected against exposure or oxidation. In such cases, even the most minute imperfection or opening in the coating may result in undesired exposure thereby rendering the remaining portions of the coating ineffectual.

The method and process described above therefore provide an improved coating process of the type useful for coating powdered food products or other powdered products in a system which is continuously operated and easily controlled.

As various changes may be made in the steps and the form, construction and arrangement of the parts herein without departing from the spirit and scope of the invention and without sacrificing any of its advantages, it is to be understood that all matter herein is to be interpreted as illustrative and not in a limiting sense.

We claim:

1. An apparatus for forming a continuous coating on the particles of a powdered material including agglomerations of a plurality of particles comprising the combination of a spray chamber having downwardly directed inlet means for a solution of coating material in the top of said chamber, inlet means in the top of said chamber for a stream of compressed air carrying powdered particles, said inlet means for said solution mounted coaxially in the center of the particle inlet, outlet means in the bottom of said chamber, means connected to said solution inlet means for introducing a mist of said solution and fan means connected to said air inlet for introducing the stream of air containing said particles, said particles during their travel in the chamber to the outlet being subjected to a spray of said coating material so as to at least partially coat the particles, an upwardly inclined screw conveyor connected directly to the outlet of said spray chamber to receive the partially coated particles and to immediately thereafter thoroughly mix and move said individual and agglomerated particles from said spray chamber so as to cause the sprayed and moving particles to roll over one another causing the coating to completely cover the individual and agglomerated particles, a vibratory feeder connected directly to the outlet of said screw conveyor to receive the coated particles, a second conveyor having its inlet at an outlet of said vibratory feeder whereby said vibratory feeder discharges said particles onto said second conveyor and drying means positioned at said second conveyor for drying particles on said second conveyor.

2. An apparatus as claimed in claim 1 in which said drying means comprise oven means.

3. An apparatus as claimed in claim 1 in which the screw conveyor is inclined at an angle of about 45°.

4. An apparatus as claimed in claim 1 which further comprises a sifter at the outlet end of said second conveyor.